(12) United States Patent
Hunukumbure et al.

(10) Patent No.: US 8,111,709 B2
(45) Date of Patent: Feb. 7, 2012

(54) MIMO WIRELESS COMMUNICATION SYSTEM

(75) Inventors: Mythri Hunukumbure, Hillingdon (GB); Michael John Beems Hart, London (GB)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 12/248,081

(22) Filed: Oct. 9, 2008

(65) Prior Publication Data

US 2009/0103486 A1 Apr. 23, 2009

(30) Foreign Application Priority Data

Oct. 19, 2007 (GB) .................................. 0720559.4

(51) Int. Cl.
*H04J 3/16* (2006.01)
(52) U.S. Cl. ........................ 370/437; 455/296
(58) Field of Classification Search .................. None
See application file for complete search history.

(56) References Cited

U.S. PATENT DOCUMENTS

| | | | |
|---|---|---|---|
| 7,526,036 B2 * | 4/2009 | Mehta et al. .................. | 375/260 |
| 2003/0103584 A1 | 6/2003 | Bjerke et al. | |
| 2006/0104196 A1 | 5/2006 | Wu et al. | |
| 2007/0211813 A1 * | 9/2007 | Talwar et al. ................. | 375/267 |
| 2008/0009256 A1 * | 1/2008 | Anderson ..................... | 455/296 |
| 2008/0049596 A1 * | 2/2008 | Khojastepour et al. ....... | 370/203 |
| 2008/0130790 A1 * | 6/2008 | Forenza et al. ............... | 370/210 |
| 2008/0273618 A1 * | 11/2008 | Forenza et al. ............... | 375/261 |
| 2008/0299981 A1 * | 12/2008 | Foschini ....................... | 455/446 |
| 2008/0304464 A1 * | 12/2008 | Borkar et al. ................. | 370/342 |
| 2009/0080560 A1 * | 3/2009 | Na et al. ........................ | 375/267 |

FOREIGN PATENT DOCUMENTS

| | | |
|---|---|---|
| EP | 1 185 001 | 3/2002 |
| EP | 1860789 | 11/2007 |
| GB | 2406759 | 4/2005 |

(Continued)

OTHER PUBLICATIONS

European Patent Office "Examination Report" issued for corresponding European Patent Application No. 08 163 447.9, dated Feb. 28, 2011.

(Continued)

*Primary Examiner* — Anh-Vu Ly
(74) *Attorney, Agent, or Firm* — Myers Wolin, LLC.

(57) ABSTRACT

A wireless communication method in a MIMO OFDMA system in which users in each of multiple adjacent cells are served by a base station of the cell, the base station having a transmission link to each user in the cell on a respective MIMO channel. The method involves the base station ($BS_A$) of a first cell carrying out the following steps: receiving, from a base station ($BS_B$) or user (B) of another cell, one or more requests for reduction of interference which it is causing to users in that other cell; identifying a rank deficient MIMO channel ($H_A$) among its transmission links to users in the first cell to select a MIMO channel to be made the subject of zero forcing; and applying zero forcing to transmissions on the selected MIMO channel ($H_A$) to reduce interference experienced by at least one user (B) in the other cell. A rank deficient MIMO channel is chosen to minimize the reduction of overall data capacity due to the zero forcing; it is found by examining eigenvalues of the channel matrix and calculating ratios thereof. In addition, correlation between the selected channel ($H_A$) and the channel ($H_B$) to the user (B) in the other cell is checked and if they are correlated by more than a threshold amount, another channel in the first cell is selected instead.

17 Claims, 8 Drawing Sheets

FOREIGN PATENT DOCUMENTS

| GB | 2417651 | 3/2006 |
|---|---|---|
| WO | 2007041086 | 4/2007 |
| WO | 2007106454 | 9/2007 |

OTHER PUBLICATIONS

M. Erlihson et al.; "Receive Beamforming with Null Steering in the 802.16m"; IEEE 802.16 Broadband Wireless Access Working Group; Dated Jul. 7, 2008; [Ref.: European Patent Office Examination Report, dated Feb. 28, 2011] [URL: http://ieee802.org/16>].

UK Intellectual Property Office Search Report for corresponding UK Application No. GB0720559.4; date of search Nov. 20, 2007.

IEEE Computer Society and the IEEE Microwave Theory and Techniques Society; Part 16: Air Interface for Fixed and Mobile Broadband Wireless Access Systems. Amendment 2: Physical and Medium Access Control Layers for Combined Fixed and Mobile Operation in Licensed Bands and Corrigendum 1. IEEE Std 802.16e-2005 and IEEE Std 802.16-2004/Cor1-2005 (Amendment and Corrigendum to IEEE Std 802.16-2004). Feb. 28, 2006.

IEEE Computer Society and the IEEE Microwave Theory and Techniques Society; Sponsored by the LAN/MAN Standards Committee. IEEE Standard for Local and metropolitan area networks; Part 16: Air Interface for Fixed Broadband Wireless Access Systems. IEEE Std 802.16-2004 (Revision of IEEE Std 802.16-2001). Oct. 1, 2004.

Mark Cudak, Motorola. "IEEE 802.16m System Requirements"; IEEE 802.16 Broadband Wireless Access Working Group. Dated Oct. 19, 2007. URL: http://ieee802.org/16.

Spencer et al.; Zero-Forcing Methods for Downlink Spatial Multiplexing in Multiuser MIMO Channels. IEEE Transactions on Signal Processing, vol. 52, No. 2, Feb. 2004.

Juntti et al.; "MIMO Receiver Architectures for OFDMA Based Broadband Wireless Access"; Tekes GIGA & Ubicon Technology Program USA (NSF) Networking Seminar, May 22, 2007, Helsinki, Finland 2007. URL: http://www.cwc.oulu.fi.

Love et al.; "Multimode Precoding for MIMO Wireless Systems"; IEEE Transactions on Signal Processing, vol. 53, No. 10, Oct. 2005. pp. 3674-3678.

Weisstein, Eric W.; "Eigenvalue."From Mathworld—A Wolfram Web Resource. Retrieved Dec. 9, 2008. URL: http://mathworld.wolfram.com/Eigenvalue.html.

Literature Review of Some Published Channel Measurement Study Since 1995.

Zhang et al.; "Approaching MIMO-OFDM Capacity with Closed-Loop V-Blast", IEEE Globecom 2006, IEEE Transactions on Signal Processing vol. 56, issue 10, pp. 5191-5203.

The International Engineering Consortium "OFDM for Mobile Data Communications" Web ProForum Tutorials Copyright 2007 URL: http://www.iec.org/online/tutorials/ofdm/index.asp.

Bauch et al.; "Sum Capacity, Rate Distribution and Scenarios for Multiuser Diversity in MIMO-OFDMA"; IWCMC'07, Aug. 12-16, 2007, Honolulu, Hawaii, USA.

Wikipedia, "Categories of MIMO" Wikipedia Dec. 9, 2007 URL: http://en.wikipedia.org/wiki/Multiple-input_multiple-output_communications.

Durgin, Gregory D.; "Wireless Communications: Modeling Random Fading Channels" Prentice Hall, Mar. 5, 2004. URL: http://www.informit.com/articles/printerfriendly.aspx?p=169488 Retrieved: Dec. 9, 2008.

Michalke et al.;"Linear MIMO Receivers vs. Tree Search Detection: A Performance Comparison Overview"; The 17th Annual IEEE International Symposium on Personal, Indoor and Mobile Radio Communications (PIMRC' 06).

Ikram et al.; "An enhanced closed-loop MIMO design for OFDM/OFDMA-PHY"; IEEE C802.16e-04/267; Aug. 17, 2004.

Jung et al.; "Bit and Power Allocation for MIMO-OFDM Systems with Spatial Mode Selection over Frequency-Space-Time-Selective Channels" IEEE Vehicular Technology Conference No. 60, Los Angeles, CA, USA, 2004 pp. 3404-3408.

Matic, Dusan; "Qualitative description of OFDM" JPL's Wireless Communication Reference Website, Chapter: Analog and Digital Transmission. Section: Multi-Carrier Modulation. Retrieved: Dec. 9, 2008 URL: http://wireless.per.nl/reference/chaptr05/ofdm/ofdmqual.htm.

Linnartz, J-P. M. G.; "Scatter Function" JPL's Wireless Communications Reference Website; Chapter: Wireless Channels; Section: Multipath Fading. Retrieved: Dec. 9, 2008 URL: http://wireless.per.nl/reference/chaptr03/fading/scatter.htm.

"Coherence Bandwidth"; JPL's Wireless Communications Reference Website; Chapter: Wireless Propagation Channels; Section: Multipath Fading, Rayleigh fading, Coherence Bandwidth. Retrieved: Dec. 9, 2008 URL: http://wireless.per.nl/reference/chaptr03/cohbw/cohbw.htm.

Wikipedia; "Precoding" from Wikipedia, the free encyclopedia. Retrieved: Nov. 20, 2008. URL: http://en.wikipedia.org/wiki/Precoding.

Wikipedia; "Spatial multiplexing" from Wikipedia the free encyclopedia. Retrieved: Dec. 12, 2008. URL: http://en.wikipedia.org/wiki/Spatial_multiplexing.

Khaled et al.; "Interpolation-Based Multi-Mode Precoding for MIMO-OFDM Systems"; IEEE Transactions on Wireless Communications, vol. 6, Issue 3, pp. 1003-1013, Mar. 2007.

Khaled et al.; "Quantized Multi-Mode Precoding for Spatial Multiplexing MIMO-OFDM Systems"; Proc. 62nd IEEE Vehicular Technical Conference (VTC-2005-Fall), Dallas, TX, pp. 867-871, Sep. 2005 Retrieved: Dec. 9, 2008. URL: http://users.ece.utexas.edu/~rheath/papers/2005/vtcFall2/.

Bolcskei et al.; "Space-Frequency Coded MIMO-OFDM with Variable Multiplexing-Diversity Tradeoff"; Proc. IEEE International Conference Communications (ICC), Anchorage, AK, pp. 2837-2841, May 2003.

Su, Karen, Trinity Hall, "Space-Time Coding: From Fundamentals to the Future" First Year Report Submitted for Admission to Candidacy for the Degree of Doctor of Philosophy, Laboratory Department for Communication Engineering, Department of Engineering, University of Cambridge, 2003.

JPL's Wireless Communication Reference Website; "Delay Spread" Chapter: Wireless Channels; Section Multipath Fading; Retrieved: Nov. 11, 2008 URL: http://wireless.per.nl/reference/chaptr03/fading/delayspr.htm.

M. Hunukumbre et al.; "Efficient MIMO downlink interference cancellation using pre-coding" IEEE 802.16 Broadband Wireless Access Working Group, No. C802.16m-08/449; XP002530354; Dated May 2, 2008. Ref.: ESR Jul. 8, 2009.

Institute for INFOCOMM Research (I2R) et al.; "Transmit Antenna Selection Techniques for Uplink E-UTRA"; 3GPP Draft; R1-051398, 3rd Generation Partnership Project (3GPP); Mobile Competence Centre; 650, Route Des Lucioles; F-06921 Sophia-Antipolis Cedex; France; vol. RAN WG1, No. Seoul, Korea; 20051107, Nov. 1, 2005. Ref.: ESR Jul. 8, 2009.

Industrial Technology Research Institute; "Evaluation of Downlink MIMO Transmission Mode Selection"; 3GPP Draft; R1-060774, 3rd Generation Partnership Project (3GPP); Mobile Competence Centre; 650, Route Des Lucioles; F-06921 Sophia-Antipolis Cedex; France; vol. RAN WG1, No. Athens, Greece;20060327, Mar. 21, 2006. Ref.: ESR Jul. 8, 2009 and ESR Jul. 10, 2009.

Zirwas et al.; "Cooperative Antenna Concepts for Interference Mitigation" European Wireless Conference; Jan. 1, 2007. Ref.: ESR Jul. 10, 2009.

Taesang Yoo et al.; "On the Optimality of Multiantenna Broadcast Scheduling Using Zero-Forcing Beamforming"; Journal on Selected Areas in Communications; vol. 24, No. 3, Mar. 2006. Ref.: ESR Jul. 10, 2009.

Extended European Search Report with Abstract and Annex to the European Search Report on European Patent Application No. 08163447.9; Dated Jul. 8, 2009.

Extended European Search Report with Abstract and Annex to the European Search Report on European Patent Application No. 08166035.9; Dated Jul. 10, 2009.

\* cited by examiner

MIMO WIRELESS COMMUNICATION SYSTEM

CROSS REFERENCE TO RELATED APPLICATIONS

This application claims priority to United Kingdom Application No. 0720559.4 filed on Oct. 19, 2007, the disclosure of which is expressly incorporated herein by reference in its entireties.

The present invention relates to wireless communication systems, and more particularly to wireless communication systems having multiple-input, multiple-output (MIMO) capability, especially but not exclusively OFDMA systems including those compliant with the IEEE 802.16 standards. The entire contents of IEEE Std 802.16-2004 "Air Interface for Fixed Broadband Wireless Access Systems" and IEEE Std 802.16e-2005 "Amendment 2 and Corrigendum 1 to IEEE Std 802.16-2004" are hereby incorporated by reference.

Wireless communication systems are widely known in which a base station (BS) communicates with multiple subscriber stations (SS or MS, also called users) within range of the BS. The area covered by one BS is called a cell and typically, many base stations are provided in appropriate locations so as to cover a wide geographical area more or less seamlessly with adjacent cells. Each BS divides its available bandwidth, i.e. frequency and time resources, into individual resource allocations for the users. There is a constant need to increase the capacity of such systems in order to accommodate more users and/or more data-intensive services.

OFDM is one known technique for transmitting data in a wireless communication system. An OFDM (Orthogonal Frequency Division Multiplex)-based communications scheme divides data symbols to be transmitted among a large number of subcarriers (also called frequency fingers) which are equally spaced in frequency, hence frequency division multiplexing. By carrying only a small amount of data on each subcarrier, the bit rate per subcarrier is kept low and hence intersymbol interference is reduced. Data is modulated onto a subcarrier by adjusting its phase, amplitude, or both phase and amplitude.

The "orthogonal" part of the name OFDM refers to the fact that the spacings of the subcarriers are specially chosen so as to be orthogonal, in a mathematical sense, to the other subcarriers. More precisely, they are arranged along the frequency axis such that the sidebands of adjacent subcarriers are allowed to overlap but can still be received without inter-subcarrier interference, commonly referred to as ICI. In mathematical terms, the sinusoidal waveforms of each subcarrier are called eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different users of the wireless communication system, the result is a multi-access system referred to as OFDMA. (In this specification, the term OFDM is henceforth used to include OFDMA). By assigning distinct frequency/time resources to each user in a cell, OFDMA can substantially avoid interference among the users within a cell. However, interference from adjacent cells can still be a problem as explained later.

A further modification of the basic OFDM scheme is called MIMO OFDM, where MIMO stands for multiple-input multiple-output. This scheme employs multiple antennas at both the transmitter and the receiver to enhance the data capacity achievable between the BS and each user. For example, a 4×4 MIMO channel is one in which transmitter and receiver communicate with one another each using four antennas. There is no need for the transmitter and receiver to employ the same number of antennas. Typically, a base station in a wireless communication system will be equipped with many more antennas in comparison with a mobile handset, owing to differences in power, cost and size limitations.

Considering the simplest example of a transmitter (e.g. base station) communicating with a single receiver (subscriber station), the MIMO channel is the frequency (or equivalently time delay) response of the radio link between the transmitter and receiver. It contains all the sub-carriers, and covers the whole bandwidth of transmission. A MIMO channel contains many individual radio links hence it has Nt×Nr SISO channels (also called sub-channels). For example, a 2×2 MIMO arrangement contains 4 links, hence it has 4 SISO channels. The SISO channels can be combined in various ways to transmit one or more data streams to the receiver.

FIG. 1 is a conceptual diagram of a generalized MIMO system. In FIG. 1, a transmitter transmits signals utilizing Nt transmitting antennas, and the receiver receives the signals from the transmitter utilizing Nr receiving antennas. The characteristics of the individual SISO channels or subchannels between the transmitter and receiver are denoted by $H_{0,0}$ to $H_{Nr-1, Nt-1}$, and as indicated in the Figure, these form terms of a matrix called the channel matrix or channel response matrix H. "$H_{0,0}$" indicates the channel characteristics (for example, channel frequency response) for transmitting signals from the transmitting antenna 0 to the receiving antenna 0. "$H_{Nr-1, Nt-1}$" indicates the channel characteristics for transmitting signals from the transmitting antenna Nt−1 to the receiving antenna Nr−1, and so on. Since the receiving antennas are not individually addressable by the transmitter, there are a maximum of Nt data streams.

In FIG. 1, the symbols $x_0$ to $x_{Nt-1}$, which are transmitted using the transmitting antennas $N_0$ to $N_{Nt-1}$, form a transmit vector x. Likewise, received signals $y_0$ to $t_{Nr-1}$, which are received using the receiving antennas $N_0$ to $N_{Nr-1}$, together form a received signal vector y. Without precoding (see below), the vectors y and x are related by: y=H.x+n, where H is the channel matrix and n is a term representing noise in each receiving antenna.

The channel matrix H has a rank which is the number of independent rows or columns. When some of the rows or columns are mutually-dependent (indicating correlation between the individual subchannels) the MIMO channel is called "rank deficient". In such a case, the MIMO channel is incapable of providing the maximum data throughput due to correlation.

MIMO transmission schemes include so-called non-adaptive and adaptive configurations. In the non-adaptive case, the transmitter does not have any knowledge of the channel properties and this limits performance, as the transmitter cannot take account of changes in conditions (channel profile). Adaptive schemes rely on the receiver feeding back information (channel-state information or CSI) to the transmitter, or locally deriving the CSI, allowing it to adapt the transmitted signal to changing conditions and maximise data throughput. A feedback path (not shown) from the receiver to the transmitter carries the feedback signals for informing the transmitter of the channel properties.

Closed loop systems are required in FDD (Frequency Division Duplex) systems, where the uplink (mobile to base station) and downlink (vice-versa) employ two different carrier frequencies. Because of the frequency change, the uplink and downlink channels are different and CSI needs to be fed back.

In TDD (Time Division Duplex) systems the uplink and downlink are transmitted in two adjacent time slots on the same frequency. The two time slots are within the channel coherence time (the channel does not change) so the channel state information need not be fed back. The transmitter can estimate the channel from the received signal on the reverse link, usually aided by the insertion of pilots or known waveforms by the transmitter into the signal sent on the reverse link.

The invention to be described is applicable to both TDD and FDD systems, but is concerned with the downlink, namely transmissions from a base station acting as the transmitter to its users acting as receivers, rather than to the uplink.

Typically, MIMO configurations involve pre-coding at the transmitter, whereby the data symbols to be transmitted are weighted using eigenvectors of each subcarrier, subchannel or subchannel group. In other words, channel-state information is used to adapt the transmit vector x to the channel conditions. This effectively allows the MIMO channel to be decomposed into a set of parallel SISO channels, so-called eigenmode signalling, so that the symbols are (given perfect channel-state information) perfectly separated at the receiver. The eigenmodes available in the channel are also called spatial modes. However, the pre-coding weight of each frequency band or group of subchannels needs to be constantly updated. The optimal or preferred width of this band or group of subchannels is dependent upon the coherence bandwidth of the spatial modes of the MIMO channel. Calculation of this coherence bandwidth is based on obtaining the eigenvalues from the MIMO channel matrices across the OFDM frequency spectrum. Precoding can be either linear, achieving reasonable results whilst limiting the complexity of processing, or non-linear, achieving near-optimal results but at the cost of greater complexity. One form of linear preceding is so-called "zero-forcing" as referred to below.

FIG. 2 is a diagram showing the configuration of a MIMO system in more concrete terms. MIMO system 1 comprises a transmitter 2 which comprises a plurality of transmitting antennas and a receiver 3 which comprises a plurality of receiving antennas.

The transmitter 2 transmits symbols 0 to Nt−1 in parallel using Nt transmitting antennas; the symbols can be created from one data stream, referred to as vertical encoding, or different data streams, referred to as horizontal encoding. In addition, each transmitted symbol corresponds to, for example, one-bit data if the modulation method is BPSK, and corresponds to two-bit data if the modulation method is QPSK. The receiver 3 receives the signals transmitted from the transmitting device 2 using Nr receiving antennas, and it comprises a signal regeneration unit 4 which regenerates the transmitted symbols from the signals received. In this configuration, a number of spatial modes is available corresponding to the minimum value of Nt and Nr.

As indicated by the arrows in FIG. 2, the signals transmitted from each of the plurality of transmitting antennas are received by each of the plurality of receiving antennas, giving rise to Nt×Nr subchannels in total. In other words, the signals transmitted from the transmitting antenna (0) are received by receiving antennas (0) through (Nr−1), and likewise, the signals transmitted from the transmitting antennas (Nt−1) are also received by the receiving antennas (0) through (Nr−1). The characteristics of the subchannel which propagates the signals from the i-th transmitting antenna to the j-th receiving antenna are expressed as "$H_{ij}$" and form one component term of the Nt×Nr channel matrix H.

The subchannel characteristics are measured prior to transmission of actual data, typically by sending pilot signals. The transmitter 2 first transmits a pilot signal using the transmitting antenna (0). The receiver 3 receives the pilot signal transmitted from the transmitting antenna (0) through the receiving antennas (0) to (Nr−1). In this case, since the transmitting power of the pilot signal is determined in advance, the receiving device 3 obtains each component ($H_{0,0}$ to $H_{0,Nr-1}$) of the first row in the channel matrix by monitoring the power, SNR, etc. of the signal received through the receiving antennas (0) to (Nr−1). Thereafter, each component of the 2nd to Nt-th rows in the channel matrix can be obtained, in the same way using pilot signals transmitted from each transmitting antenna.

In the MIMO system 1, if the symbol x ($x_0 \sim x_{Nt-1}$) is transmitted from the transmitting device 2, the signal y ($y_0 \sim y_{Nr-1}$) detected in the receiving device 3 is expressed by equation (1). Therefore, in the absence of noise n, the receiving device 3 can obtain correct transmitted symbols by detecting the channel matrix H and performing an inverse operation corresponding to the influence of each component in the channel matrix H on the signal. In practice, however, noise n is present and in addition, the channel matrix H cannot be determined with absolute accuracy. Therefore, the receiver 3 estimates the transmitted symbol from the received signal y and the channel matrix H and introduces an algorithm for minimizing the error of this estimated value.

By way of background explanation, a MIMO-OFDM transmitter and receiver will be briefly outlined with reference to FIGS. 3 and 4. FIG. 3 is a schematic diagram of a MIMO-OFDM transmitter. High-speed binary data is encoded (convolutional code is an example), interleaved, and modulated (using a modulation scheme such as BPSK, QPSK, 64QAM, and the like). Independent channel encoders may be used for each transmitting antenna. Subsequently, the data is converted into parallel low-speed modulated data streams which are fed to N sub-carriers. The output from each encoder is carried separately on a plurality of sub-carriers. The modulated signals are frequency-division multiplexed by N-point inverse fast Fourier transform (IFFT). The resulting OFDM signal is converted into an analog signal by a D/A converter and is upconverted into RF band and transmitted over the air.

At the MIMO-OFDM receiver schematically shown in FIG. 4, the received signals from the Nr receive antennas are filtered by a band pass filter (BPF), and then down-converted to a lower frequency. The down-converted signal is sampled by A/D converter (namely, converted into a digital signal), and the guard interval is removed. After the sampled data is fed to the N-point fast Fourier transformer (FFT). After Fourier transformation is performed on each of the signals received through the Nr receive antennas, they are fed to the MIMO signal processing unit 11. Here, the MIMO signal processing unit 11 comprises a signal regeneration unit 4 which performs algorithms to compensate for the channel characteristics, using the channel matrix H and taking account of the precoding applied on the transmitter side. For example, "zero-forcing" as described later is used to cancel interference from other users thereby compensating the channel for each sub-carrier in the frequency domain. In this example, the output of the MIMO signal processing unit 11 is Nt independent data streams, and each data stream is independently demodulated, de-interleaved, and decoded. However, the outputs may be demultiplexed to form a single data stream, if a single stream was multiplexed, i.e. vertical encoding was applied, at the transmitter on to multiple antennas.

The methodology of zero forcing in MIMO systems for interference cancellation is well documented, and the following document is a good reference for such techniques:—

Q. H. Spencer et. al, "Zero forcing Methods for Downlink Spatial Multiplexing in Multiuser MIMO Channels", IEEE Trans. on Signal Processing, Vol. 52, No. 2, February, 2004

The above explanation has considered the case of a single transmitter sending MIMO signals to a single receiver, but of course a practical MIMO wireless communication system is much more elaborate than this, providing many mutually-adjacent cells in each of which a base station transmits over respective MIMO channels to multiple subscriber stations simultaneously. In practice, the adjacent cells overlap to some extent such that transmissions from one base station in one cell can cause interference to users at the edges of adjacent cells. If the cells have a hexagonal grid arrangement, then one cell may be adjacent to up to six neighbouring cells such that transmissions to a particular user may cause interference in more than one other cell.

MIMO and OFDMA are expected to enable high-capacity data throughput in future wireless communication systems such as those compliant with IEEE802.16m (also called Advanced WiMAX or Gigabit WiMAX). However, the above multi-user interference effects can become a significant obstacle in achieving the expected capacity enhancements in such systems. For example, a user near the edge of one cell, communicating with one BS using a particular frequency/time resource, may interfere with a user in an adjacent cell, served by a different BS using the same frequency/time resource. One promising methodology for interference reduction is to utilize some of the spatial modes for zero forcing onto users with higher interference effects, i.e. usually the cell edge users. Zero forcing can be thought of as a kind of beam forming such that by sacrificing one or more spatial modes, the beam of radio waves from a transmitter forms a null in the direction of a user for whom interference is to be reduced. The penalty with using the spatial modes for zero forcing is the potential for loss of some of the MIMO capacity.

Thus it is would be desirable to develop algorithms for identifying users at the BS where some of the spatial modes can be used for zero forcing, with minimal impact on the cell capacity.

According to a first aspect of the present invention, there is provided a wireless communication method in a MIMO system having a first cell and one or more second cells adjacent to each other, each cell served by a base station and having a plurality of fixed or mobile subscriber stations, the base station having a transmission link to each subscriber station in the cell on a respective MIMO channel, the method comprising the steps of, in the base station of the first cell: receiving, from a said second cell, a request for reduction of interference to a subscriber station in the second cell caused by transmissions from the base station of the first cell; identifying a rank deficient MIMO channel among the transmission links from the base station to each subscriber station in the first cell to select a MIMO channel to be made the subject of precoding; and applying precoding to transmissions on the selected MIMO channel to reduce interference experienced by said subscriber station in the second cell.

According to a second aspect of the present invention, there is provided a base station used in a cellular wireless communication system for transmitting data over respective MIMO channels to users in a first cell which is adjacent to one or more other cells, the base station responsive to a request received from outside the first cell for precoding its transmissions to one of the users in the first cell so as to reduce interference caused by said transmissions and experienced by one or more users in the other cells, the base station arranged to select a MIMO channel to one of its users for precoding based on whether correlation exists among constituent sub-channels of the MIMO channel.

According to a third aspect of the present invention, there is provided a MIMO wireless communication system made up of a plurality of cells each comprising a base station as specified in the statement of the second aspect and a plurality of subscriber stations served by the base station, each of the subscriber stations configured to detect interference on its downlink from the base station and operable to send a request for interference reduction.

According to a fourth aspect of the present invention, there is provided a subscriber station in a MIMO cellular network, having: a plurality of antennas for receiving MIMO transmissions from a base station of its own cell; means for detecting interference from a base station in another cell of the network; means for sending a request for nulling said interference; and means for adaptively selecting a number of its antennas currently in use according to a request from a base station.

Thus, embodiments of the present invention can provide a technique for selection of users for zero forcing onto other-cell users (at cell edge) who suffer from higher interference effects.

Reference is made, by way of example only, to the accompanying drawings in which.

Figure 1:
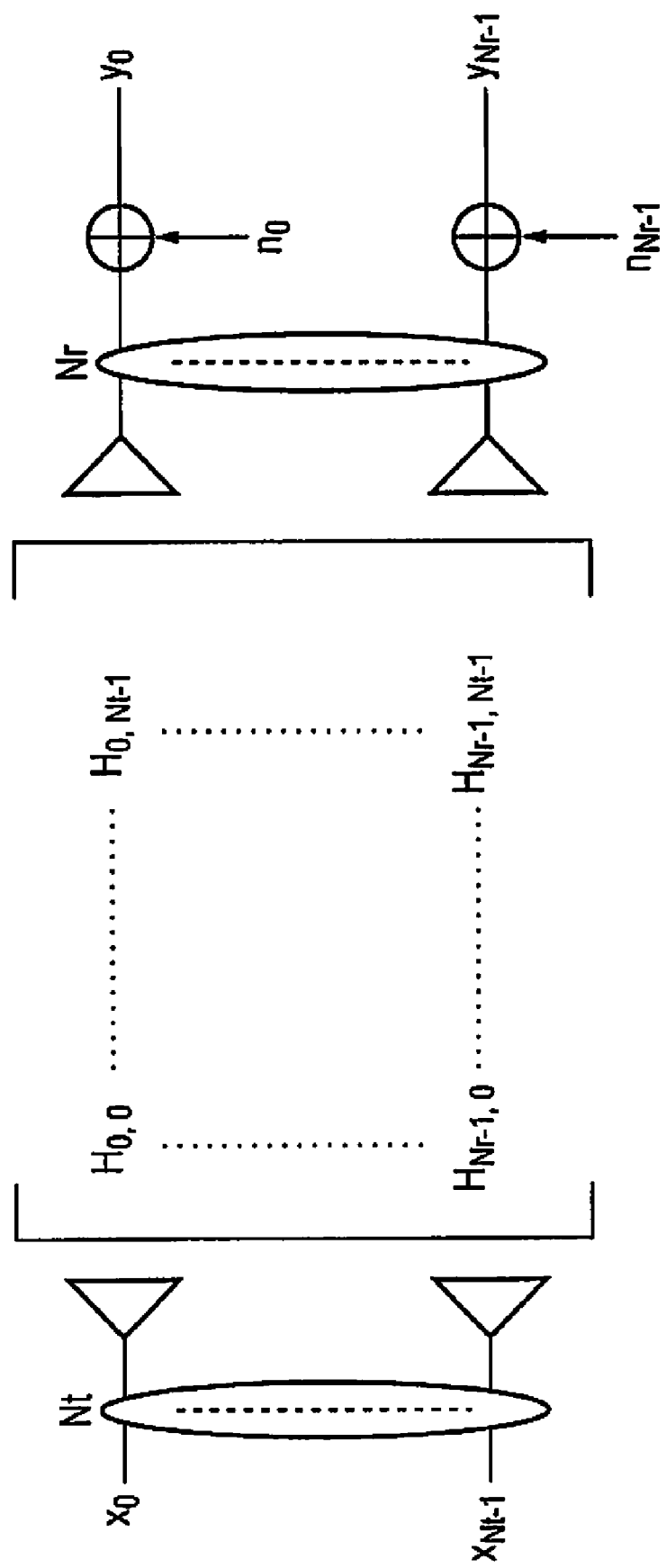
FIG. 1 is a conceptual diagram of a MIMO communication channel.
Figure 2:
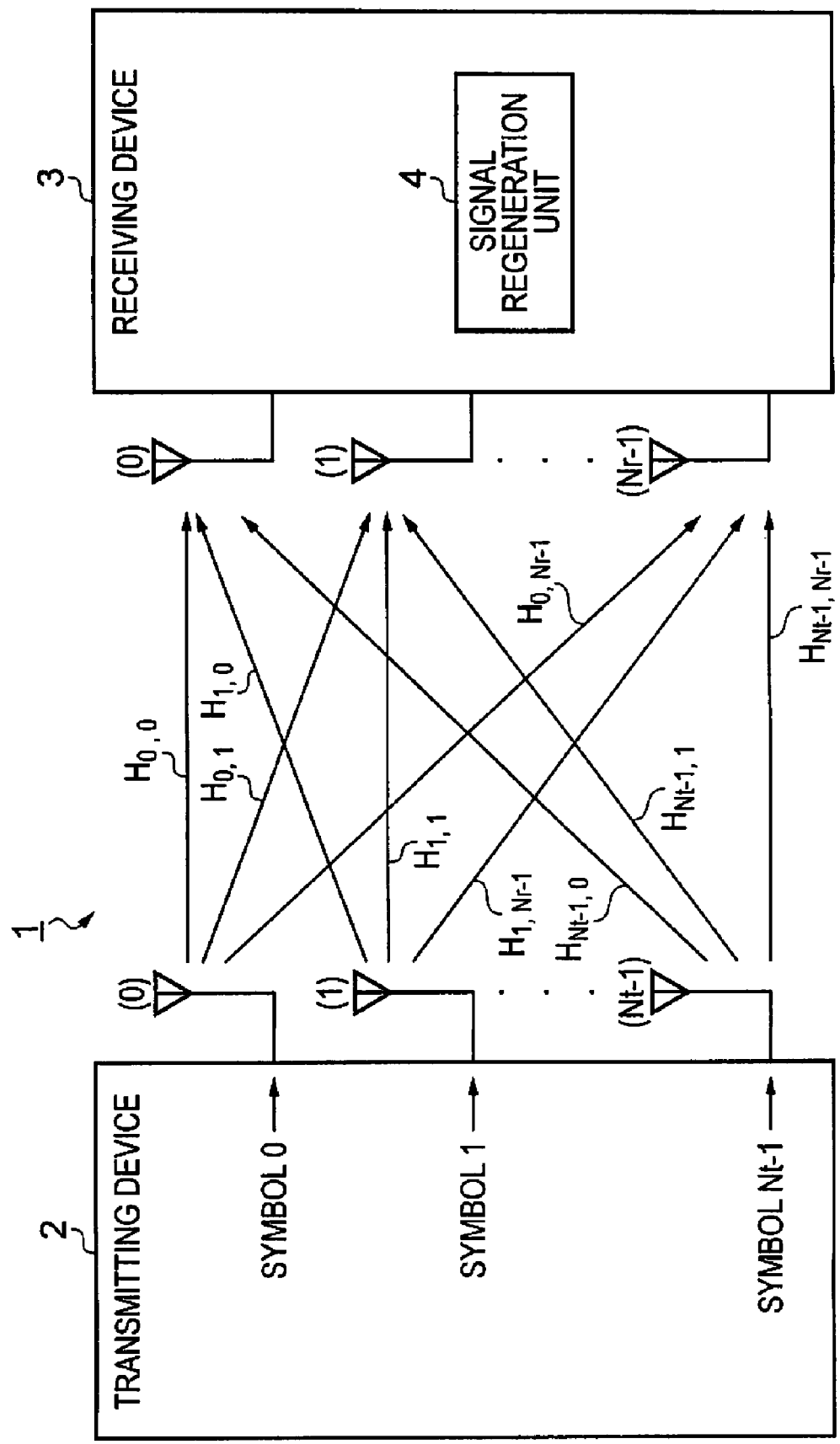
FIG. 2 is a schematic diagram of a transmitter and a receiver communicating via a MIMO channel.
Figure 3:
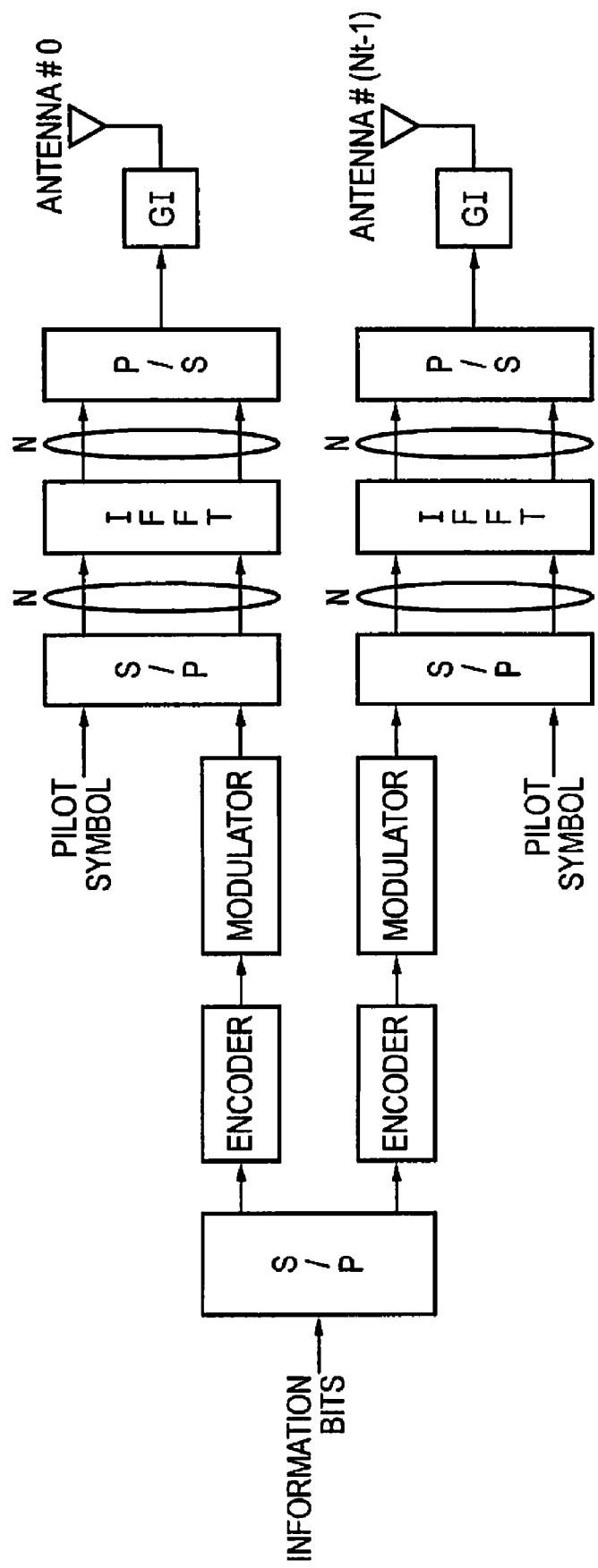
FIG. 3 is a schematic diagram of a MIMO-OFDM transmitter.
Figure 4:
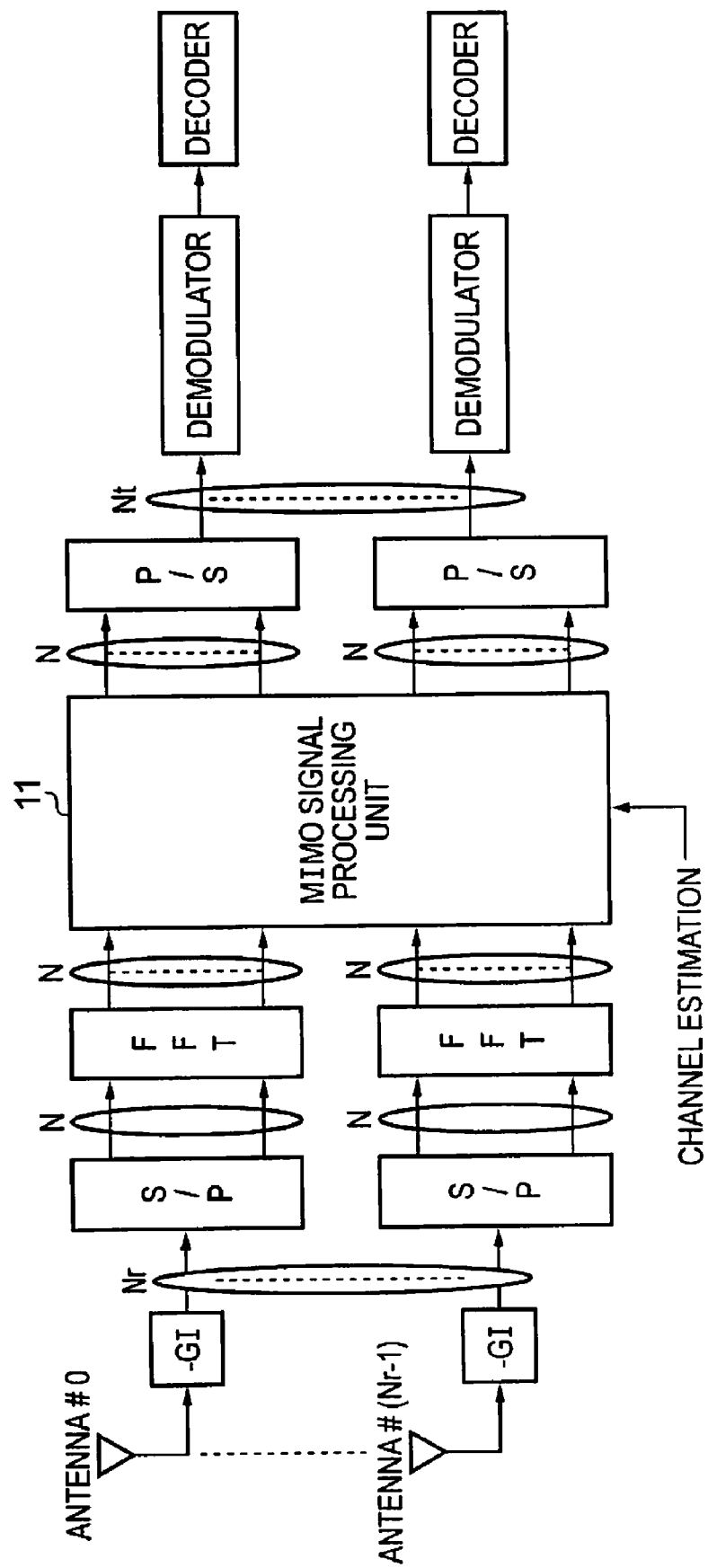
FIG. 4 is a schematic diagram of a MIMO-OFDM receiver.

Before explaining an embodiment of the present invention with respect to FIGS. 5 to 8, the underlying principles will first be outlined.

The basic idea of MIMO zero forcing can be explained as follows. Consider a user A served by a base station $BS_A$, and another user B who is at or near the edge of an adjacent cell, served by another base station $BS_B$. User A is referred to as an "in-cell" user, and B as an adjacent cell user or "cell edge" user for convenience, though it should be noted that such a user need not be physically located at a cell edge. If both users A and B are visible to the base station $BS_A$ through radio channels $H_A$ and $H_B$ and employ $Nr_1 \times Nt$ and $Nr_2 \times Nt$ (number of receive by number of transmit antennas) MIMO systems respectively ($Nt = Nr_1 + Nr_2$), the transmission data vectors to A (from $BS_A$) can be pre-coded with a $Nt \times Nr_1$ precoding matrix $V_0$ such that there is no interference to user B from this transmission. The matrix $V_s$ is generated by obtaining the singular vectors (through singular value decomposition) of radio channel $H_B$. Matrix $V_0$ consists of the last $(Nt - Nr_2)$ column vectors of the right singular matrix $V_s$ of $H_B$, which spans a null space as $Nt > Nr_2$. In mathematical notation this can be written as:

$$[U_s, D, V_s] = svd(H_B)$$

$$V_s = [V_1 V_0] \quad (1)$$

where $U_s$ is the left singular matrix and D is a diagonal matrix with n singular values as the diagonal elements.

The $Nr_1 \times 1$ received signal vector y for user A with precoding with $V_0$ (c.f. eqn (1)) becomes:

$$y = H_A \cdot V_0 \cdot x + n \quad (2)$$

Where x is the Nt×1 transmit vector and the $Nr_1 \times 1$ vector n denotes the noise addition. As $V_0$ contains (Nt−$Nr_2$) columns the transmission from A is limited to $Nr_1$=(Nt−$Nr_2$) parallel streams as a result of pre-coding. This may result in a loss of capacity, considering that Nt (if A has the potential to employ a Nt×Nt MIMO system) parallel data streams are possible if this pre-coding scheme was not applied. However, the actual loss will depend on the capacity that was available on the $Nr_2$ streams that are instead to be utilised for zero forcing. Furthermore, the radio channel $H_A$ is required to be de-correlated from the radio channel $H_B$ from the same base station in order to achieve an effective data transmission to A. That is, it is not feasible to provide a strong signal to user A if this would be close to a null beam seen by user B.

As already indicated above, the present invention is particularly applicable to OFDMA (Orthogonal Frequency Division Multiple Access) based systems where the inter-cell interference is generated by collisions from the utilization of the same time/frequency resources in adjacent cells. When user B approaches the cell edge of the serving base station $BS_B$, he will see significant interference from adjacent cell base station $BS_A$ which serves its user A with the same time/frequency resource. Interference to user B may also occur even without user B approaching the cell edge, e.g. if $BS_A$ is transmitting with a high power. The known method to deal with this is to separate the users in the time and/or frequency domain, however this will result in a reduction in the capacity of the system. Instead, the present invention uses the above pre-coding method where the signals transmitted to user A can be pre-coded with matrix $V_0$ such that the interference to user B is nullified. This also involves a loss of capacity (since the effect of the precode matrix is to reduce the number of symbols transmitted, less data is received by user A) so the present invention aims to address this problem.

The present invention provides an algorithm to scan across active users in $BS_A$ and select user A such that the capacity loss referred to above is minimized and there is a net gain in the capacity as a result of the interference reduction afforded to user B. Compared with known techniques for dealing with cell-edge interference, the present invention provides the potential to achieve a net gain in capacity. The algorithm applies zero forcing to the most rank-deficient channel, that is, to the user who will be least affected by removing some of the parallel MIMO streams.

An embodiment of the present invention will now be explained in more detail. For convenience, the following description refers to a "base station" as carrying out the technique of the present invention, but in general the present invention can be applied to any transmitter capable of communicating with multiple users in a wireless communication system including a relay station, a subscriber station in a peer-to-peer network, etc. The term "base station" as used in the claims should accordingly be given a broad interpretation.

In order to ensure the net capacity gain, the base station searches for "rank deficient" MIMO channels (that is, channels where two or more of the constituent MIMO sub-channels are correlated, and hence they will provide minimal capacity improvement to the overall user capacity) amongst its active users, and allocates the pre-coding vector to the most rank-deficient channel.

To identify rank deficient channels, the base station looks at the eigenvalues of the absolute MIMO channel matrix (H.H*, with * denoting conjugate transpose) and measures the ratio of the largest eigenvalue ($\lambda_m$) to the smallest value ($\lambda_1$). Typically, the base station will already be calculating these eigenvalues for other purposes (waterfilling, eigen decomposition etc) so the additional processing overhead is not high. The present invention also assumes that the number of receive antennas $Nr_1$ and $Nr_2$ can be adaptively selected within the constraint of $Nr_1+Nr_2$=Nt, depending upon the required number of spatial modes for zero forcing. In other words, it should be possible for each subscriber station to switch off one or more of its antennas. This requirement is based on the number of cell edge users (in multiple cells, and not necessarily at a cell edge) who can share the same frequency/time resource as the user A and thus benefit from zero forcing. A minimum of r spatial modes are required to simultaneously apply zero forcing to r cell edge users.

In general, if k spatial modes are used for zero-forcing (i.e. Nt−$Nr_1$=$Nr_2$=k) the algorithm will calculate the ratio sum ($\lambda_m/\lambda_1 + \lambda_m/\lambda_2 + \ldots + \lambda_m/\lambda_{Nr2}$) and use the channel with the largest sum ratio for pre-coding. Here, $\lambda_2$ is the second lowest eigenvalue and $\lambda_{Nr2}$ is the $Nr_2^{th}$ eigenvalue in ascending order. A final check on the channel correlation between selected channel $H_A$ and $H_B$ is carried out and if the correlation is below a pre-defined threshold value of $\rho_{th}$, the pre-coding is carried out. If the channel correlation is higher than $\rho_{th}$, the selection is discarded and the next channel with highest sum ratio of eigen values is selected, this is because of the requirement for effective data transmission mentioned previously. This process is iterated until the channel correlation between $H_A$ and $H_B$ is found to be below $\rho_{th}$. The correlation $\rho(X,Y)$ between two vectors X and Y is defined as;

$$\rho(X, Y) = \frac{E[X \cdot Y^*]}{\sqrt{E[X \cdot X^*] \cdot E[Y \cdot Y^*]}} \quad (3)$$

where E[ ] denotes the expectation operator and * denotes the complex conjugate.

In order to test the effectiveness of this algorithm, a set of simulations was done using real MIMO channel data and SINR (Signal to Interference plus Noise Ratio) values generated from a system level simulator. The MIMO channel data is for a 4×4 system covering measurement locations which can be segmented into 2 adjacent cells. Each cell contains 13 measurement locations, which can be considered as active users. The cell deployment is shown below in FIG. 5.

Figure 5:
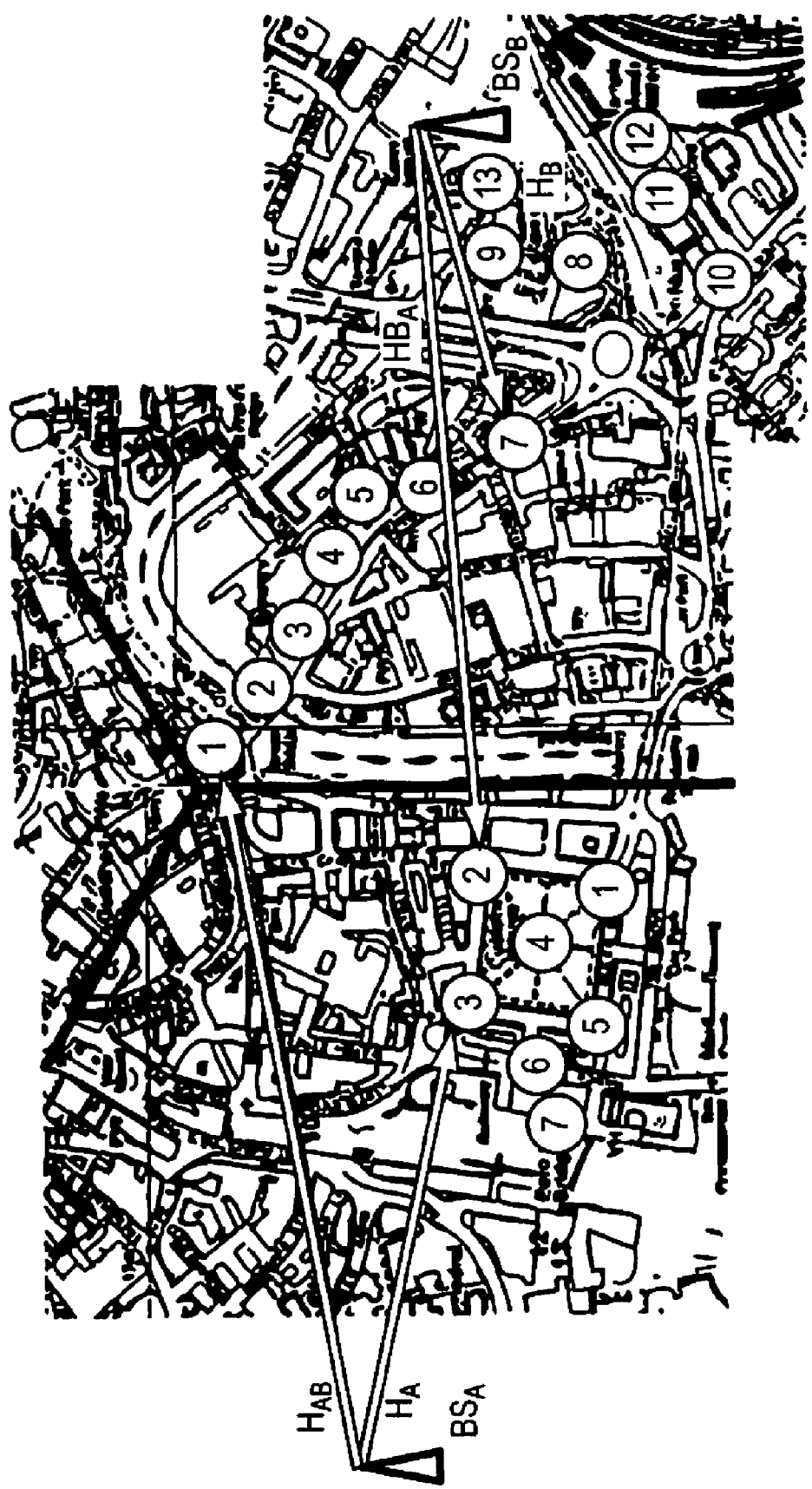
FIG. 5 illustrates a configuration of cells and users employed for the purpose of simulations.

FIG. 5 illustrates a configuration of cells and users employed for the purpose of simulations, based on real-world map data. The solid lines in the Figure denote cell edges of mutually-adjacent hexagonal cells, and numbers in circles denote individual subscriber stations or users. The elongated triangles at the edges of the Figure denote base stations of respective cells.

Figure 6:
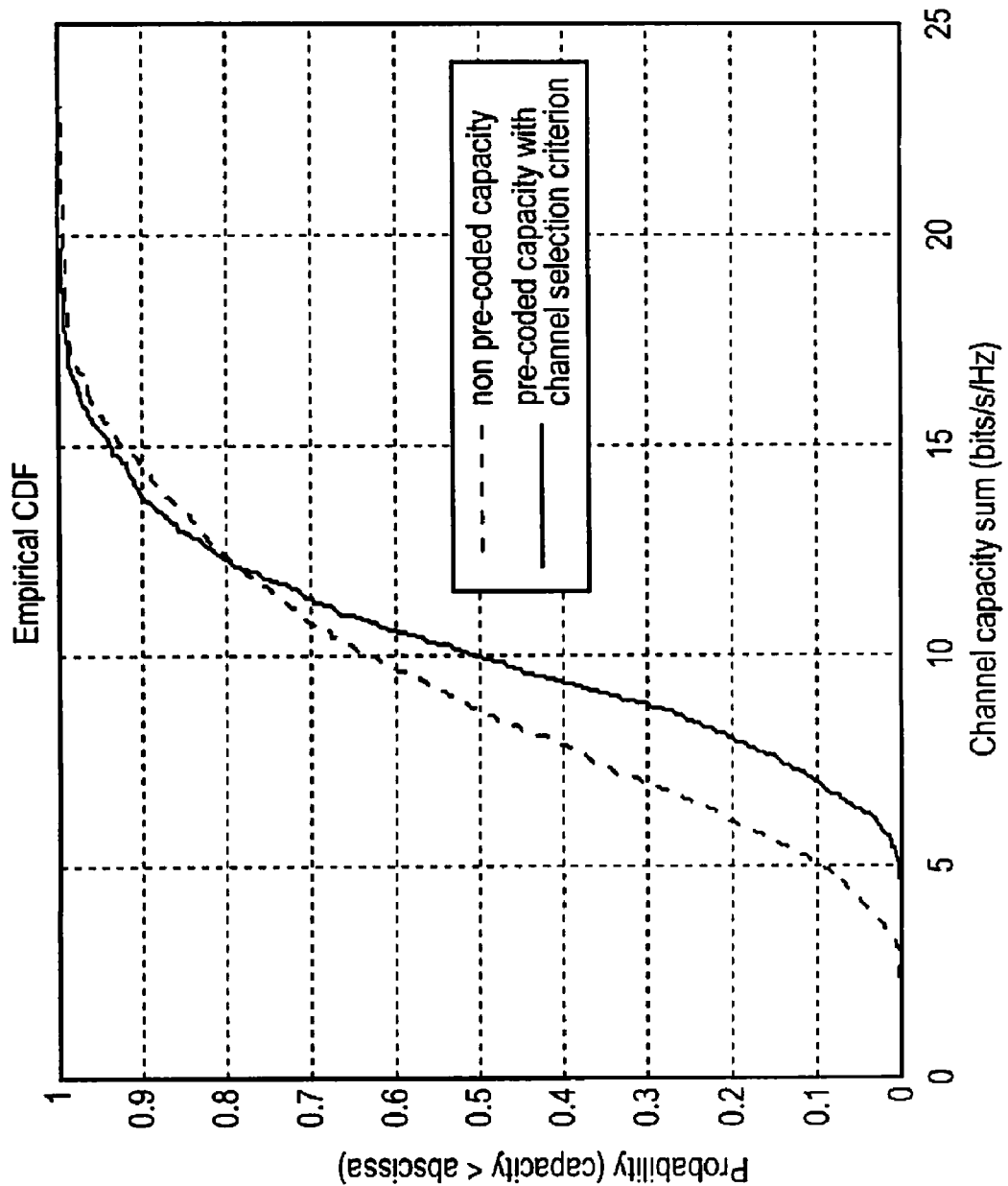
FIG. 6 is a graph showing simulated MIMO channel capacities achieved using the selection algorithm of the present invention.
Figure 7:
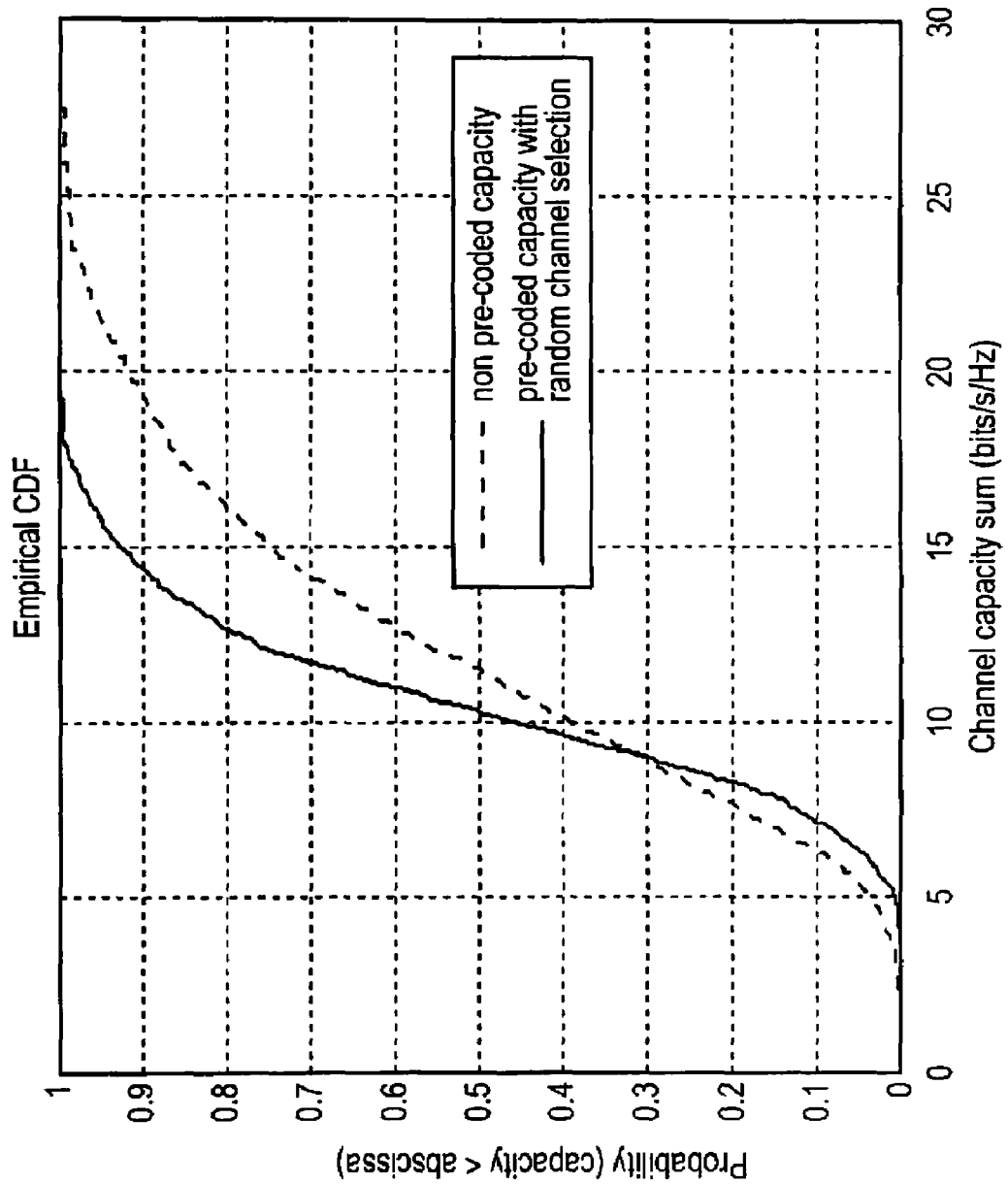
FIG. 7 is a graph showing simulated MIMO channel capacities for a random channel selection.

For the simulations, 2 cell edge users were identified (user 2 from $BS_A$ and user 1 from $BS_B$) as the users receiving most interference from the adjacent cells. Then MIMO pre-coding was conducted to nullify the interference. In other words, the method of the present invention was applied twice. The original 4×4 MIMO system was reduced to 4×2 MIMO systems for applying zero forcing, thus employing 2 spatial modes for the interference cancellation. The method of the present invention identified user 3 in $BS_A$ and user 7 in $BS_B$ as the rank deficient channels where pre-coding could be applied, as the resulting reduction in capacity for that user would be minimal. The channel capacities were calculated for the cell edge user and the selected pre-coding user with and without this pre-coding algorithm. The channel capacity for an n×n MIMO system is given by;

$$C = \log_2\left(\det\left[I_n + \frac{SINR}{n_T}(HH^H)\right]\right) \quad (4)$$

where $I_n$ is the identity matrix, H is the channel matrix and $n_T$ is the number of parallel data streams transmitted. The SINR was selected from the system level simulator, according to the distance from the base station. The cell radii are assumed to be 1000 m. The system level simulator was used to generate SINR with and without the most significant interference source. For cell edge users, these two SINR values were applied in the comparison. The cumulative distribution functions for the sum MIMO capacities (sum of cell edge user and pre-coded user) for the $BS_B$ cell are shown below in FIGS. 6 and 7. FIG. 6 compares the capacities of the pre-coding with the selection algorithm and non-precoded 4×4 systems. FIG. 7 compares pre-coding applied to a random selection of users (randomly selected from the 13 users for each iteration of the simulation) and non-precoded 4×4 systems. In each of FIGS. 6 and 7, the abscissa represents the capacity of the two users affected by the zero-forcing algorithm, namely the cell user for whom interference is to be reduced and the rank-deficient user providing one or more spatial modes for zero forcing. The ordinate represents the probability of an overall improvement in capacity.

The Figures clearly show the benefits of the proposed channel selection algorithm over a random choice for pre-coding. The proposed selection algorithm gives improved sum capacities (i.e. a net capacity benefit) 80% of the time over the non-precoded system. However with the random channel selection the net capacity benefit occurs only 30% of the time and for the remainder a significant loss is experienced. These results are specific to the measured channels and the generated SINR values (the iterations were done 1000 times for each user) but they do give an indication of the benefits of the proposed algorithm.

Therefore it can be concluded that in this scenario it was more beneficial, from a system capacity point-of-view, to utilise two streams of the rank deficient users for zero forcing, as the reduction in the individual user capacity was outweighed by the improvement in the interfered users' capacity, due to the reduction in interference.

Figure 8:
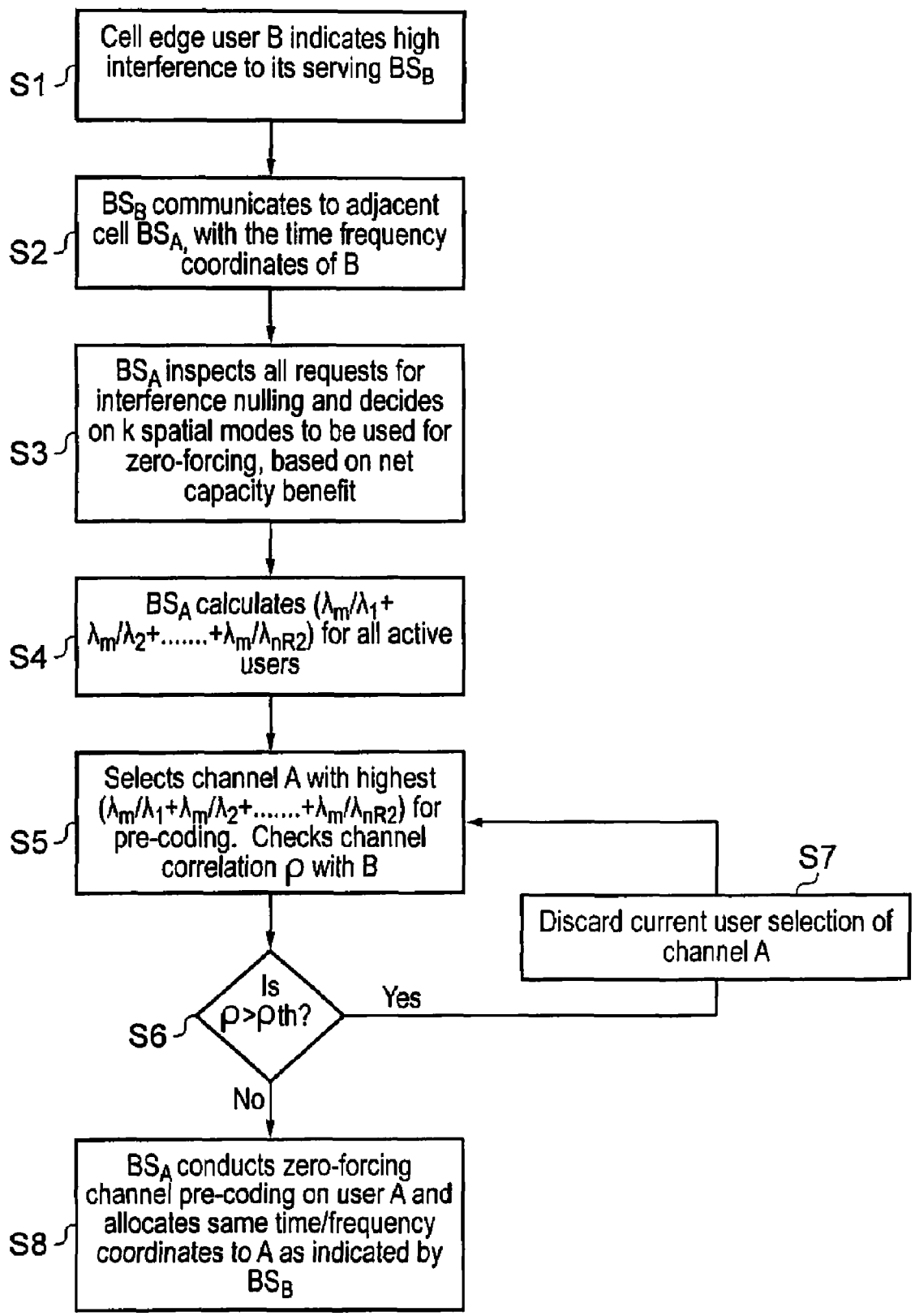
FIG. 8 is a flowchart of the channel selection algorithm for MIMO pre-coding in an embodiment of the present invention.

The flowchart of the method carried out by each base station, in a preferred embodiment of the present invention, is given in FIG. 8.

In step S1, a user in an adjacent cell (user B) reports experiencing high interference due to transmissions from base station $BS_A$. Typically it does this by sending a message on the uplink to its own base station $BS_B$. Next (S2), base station $BS_A$ receives the notification of interference together with information on the time/frequency resources allocated to user B. In this example, this is communicated to $BS_A$ from $BS_B$ e.g. via a backbone network (wired or wireless). If more than one such notification is received (S3), $BS_A$ collates and if necessary priorities them, using the criterion of a net capacity benefit (see below) to decide whether to sacrifice more than one spatial mode for zero-forcing. Then, $BS_A$ determines which of the users in its cell should provide the spatial modes for zero forcing. To minimise the loss of data capacity overall, a rank-deficient MIMO channel is selected as already mentioned. This involves calculating, for each of its active users (i.e., users in its own cell), an eigenvalue ratio or ratio sum as specified above. In step S5, the most rank-deficient channel $H_A$ (in this case, determined as the channel with the highest ratio sum $\lambda_m/\lambda_1 + \lambda_m/\lambda_2 + \ldots + \lambda_m/\lambda_{Nr2}$) is selected and the correlation between this channel and channel $H_B$ of the cell edge user B is checked. In the event of too high a correlation, (S6, Yes), step S5 is repeated selecting a different rank-deficient channel.

As a further check (as indicated in step S3 of FIG. 8) it is preferable for the base station to find out the net capacity benefit to be expected from carrying out the zero forcing, i.e. the gain in capacity on the MIMO channel to user B enabled by reduced interference, minus the loss of capacity on the rank-deficient channel to user A. If no net capacity benefit is found then the procedure is abandoned. To make this calculation it will be helpful, though not necessarily essential, for the base station to exchange information with the base station serving user B, and/or to receive information from a central controller in the system. Otherwise (S6, No) the zero-forcing is carried out, including allotting to user A the same frequency/time resources of those assigned to edge cell user B by $BS_B$.

FIG. 8 shows the steps taken for zero forcing on a single user (user A) to cancel or reduce interference to one or more cell edge users (user B). The process may be repeated to carry out zero forcing on additional users, at the expense of more spatial modes. Alternatively, it may sometimes be possible to reduce the interference experienced to two or more cell edge users by zero forcing on a single in-cell user. Such two or more cell edge users can be in multiple adjacent cells and can be allocated the same time/frequency resources. However, the total sum of active receivers (of these cell edge users plus the one in-cell rank deficient user) should not exceed Nt, the number of transmit antennas at the base station.

In order to be effective, the channel selection algorithm of the invention should normally be applied in favour of cell edge users, as cell edge users can expect a significant interference reduction. On the other hand, it is possible for users not physically at the cell edge to experience significant interference from another base station. However, in practice only a limited number of rank-deficient MIMO channels are likely to be available, and therefore, it is desirable for the base station to be selective in acting on interference-reduction requests. It may in some instances be desired to limit such requests to cell edge users, assuming that these can be identified, and this might be achieved by configuring the subscriber stations such that they only issue a request when they are cell edge users, or by configuring each base station such that it only accepts requests from subscriber stations whom it determines to be at cell edges. The above-mentioned check for a net capacity benefit will also tend to have the effect of limiting accepted requests to cell edge users.

In addition, it should be noted that whilst the flowchart in FIG. 8 is the preferred embodiment, there are some possible alternatives to the steps shown, as summarised below.

In an alternative embodiment, instead of the cell-edge subscriber station indicating to its serving station (BS) the interference situation, it directly communicates with the interfering BS. It can be assumed due to the fact that interference is significant, that the subscriber station experiencing interference will be in a position that is in range for communication with this BS. The two BSs can then either co-ordinate resource allocation, such that nulling is performed appropriately, or the subscriber station itself can arbitrate between the two BSs to prevent the need for signalling over the backbone network. If users from multiple cells communicate to the same interfering BS in this manner, this BS can decide on the k number of spatial modes to be allocated for interference nulling.

One simpler approach to calculating the sum of the eigenvalue ratios is simply to use the single ratio $\lambda_m/\lambda_{Nr2}$, where $\lambda_{Nr2}$ is the Nr2-th smallest eigenvalue. Whilst this might not be as accurate, it will give an alternative mechanism to indicate a candidate with lower processing requirements.

Thus, an embodiment of the present invention can provide a wireless communication method in a MIMO system in which users in each of multiple adjacent cells are served by a base station of the cell, the base station transmitting data on a downlink to each user in the cell via a respective MIMO channel. The method involves the base station ($BS_A$) of a first cell carrying out the following steps: receiving, from a base station ($BS_B$) or from a user (B) in another cell, one or more requests for reduction of interference which it is causing to users in that other cell; identifying a rank deficient MIMO channel ($H_A$) among its transmission links to users in the first cell to select a MIMO channel to be made the subject of zero forcing; and applying zero forcing to transmissions on the selected MIMO channel ($H_A$) to reduce interference experienced by at least one user (B) in the other cell. A rank deficient MIMO channel is chosen to minimise the reduction of overall data capacity due to the zero forcing; it is found by examining eigenvalues of the channel matrix and calculating ratios thereof. In addition, correlation between the selected channel ($H_A$) and the channel ($H_B$) to the user (B) in the other cell is checked and if they are correlated by more than a threshold amount, another channel in the first cell is selected instead.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

Such a microprocessor or DSP may be present in a base station of a wireless communication system. In a wireless communication system employing relay stations, it will be further preferable for each relay station to include functionality for performing the method according to the present invention. A processor or DSP of each subscriber station may also need adaptation to the method of the present invention, in particular to provide for sending messages to a base station outside its cell where this is required. Moreover, a subscriber station in a peer-to-peer network could itself carry out the method of the present invention.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A wireless communication method in a MIMO system having a first cell and one or more second cells adjacent to each other, each cell served by a base station and having a plurality of fixed or mobile subscriber stations, the base station having a transmission link to each subscriber station in the cell on a respective MIMO channel, the method comprising:

in the base station of the first cell:

receiving, from a second cell, a request for reduction of interference to a subscriber station in the second cell caused by transmissions from the base station of the first cell;

identifying a rank deficient MIMO channel among the transmission links from the base station to each subscriber station in the first cell, checks a correlation between a most rank deficient MIMO channel and a MIMO channel to said subscriber station in the second cell, and selects the most rank deficient MIMO channel unless the correlation exceeds a threshold which, instead selects the next most rank deficient MIMO channel to be made the subject of precoding; and applying precoding to transmissions on the selected MIMO channel to reduce interference experienced by said subscriber station in the second cell.

2. The wireless communication method according to claim 1, wherein the receiving includes receiving time and frequency co-ordinates assigned to said subscriber station in the second cell, and wherein the base station in the first cell assigns the same time and frequency co-ordinates to the selected MIMO channel.

3. The wireless communication method according to claim 1, wherein the request is received from the base station of the second cell.

4. The wireless communication method according to claim 1, wherein the request is received from said subscriber station in the second cell.

5. The wireless communication method according to claim 1, wherein the precoding involves zero forcing.

6. The wireless communication method according to claim 1, wherein said identifying identifies a rank deficient MIMO channel by finding eigenvalues $\lambda$ of each absolute MIMO channel matrix and measuring the ratio of the largest eigenvalue $\lambda_m$ to the smallest eigenvalue $\lambda_1$, wherein m is an integer.

7. The wireless communication method according to claim 6 wherein the identifying calculates, for each MIMO channel to subscriber stations in the first cell, the ratio sum:

$$\lambda_m/\lambda_1 + \lambda_m/\lambda_2 + \ldots + \lambda_m/\lambda_{Nr2}$$

where Nr2 is the number of receive antennas used by said subscriber station in the second cell, and selects the channel with the largest sum for precoding.

8. The wireless communication method according to claim 1, wherein the identifying step calculates, for each MIMO channel to subscriber stations in the first cell, the ratio:

$$\lambda_m/\lambda_{Nr2}$$

where $\lambda_m$ is the largest eigenvalue in the MIMO channel matrix, Nr2 is the number of receive antennas used by said subscriber station in the second cell, and $\lambda_{Nr2}$ is the Nr2-th eigenvalue, and selects the channel with the largest ratio for precoding, wherein m is an integer.

9. The wireless communication method according to claim 1, wherein a plurality of requests are received from the one second cell or each second cell, and the method applies the precoding to reduce interference to a plurality of said users in the second cell simultaneously.

10. The wireless communication method according to claim 9 wherein the identifying and applying are repeated for a plurality of MIMO channels among the transmission links from the base station to each subscriber station in the first cell, in order to reduce interference to the plurality of users in the one second cell or each second cell simultaneously.

11. The wireless communication method according to claim 10 wherein the applying precoding is conducted on one selected MIMO channel so as to reduce interference to the plurality of users in the one second cell or each second cell simultaneously.

12. The wireless communication method according to claim 1, wherein the base station in the first cell exchanges messages with the base station in the second cell to co-ordinate the applying precoding.

13. The wireless communication method according to claim 4, wherein said subscriber station in the second cell sends messages to the base stations of the first cell and the second cell to co-ordinate the applying precoding.

14. The wireless communication method according to claim 1, further comprising: following said identifying, estimating a net capacity effect on said MIMO system of applying the precoding, and proceeding to apply the precoding only if a net capacity benefit is estimated.

15. The wireless communication method according to claim 1, wherein the receiving, identifying, and applying are applied to the downlink of an OFDMA-based wireless communication system.

16. A subscriber station in a MIMO cellular network, comprising:
a plurality of antennas for receiving MIMO transmissions from a base station of its own cell;
a processor configured to detect interference from a base station in another cell of the network;
a transmitter configured to send a request for nulling said interference; and
the processor further configured to select a number of its antennas currently in use according to a request from a base station, wherein in a base station receiving the request for nulling said interference, the base station configured to:
identify a rank deficient MIMO channel among transmission links from the base station to each subscriber station in the base station's cell,
check a correlation between a most rank deficient MIMO channel and a MIMO channel to the subscriber station sending the request,
select the most rank deficient MIMO channel unless the correlation exceeds a threshold which, instead select the next most rank deficient MIMO channel to be made the subject of precoding, and
apply precoding to transmissions on the selected MIMO channel to reduce interference experienced by said subscriber station sending the request.

17. A non-transitory computer readable medium including executable code which, when executed by a processor in a wireless communication MIMO system having a first cell and one or more second cells adjacent to each other, each cell served by a base station and having a plurality of fixed or mobile subscriber stations, the base station having a transmission link to each subscriber station in the cell on a respective MIMO channel, controlling a process comprising:
in the base station of the first cell upon receiving, from a second cell, a request for reduction of interference to a subscriber station in the second cell caused by transmissions from the base station of the first cell,
identifying a rank deficient MIMO channel among the transmission links from the base station to each subscriber station in the first cell, checks a correlation between a most rank deficient MIMO channel and a MIMO channel to said subscriber station in the second cell, and selects the most rank deficient MIMO channel unless the correlation exceeds a threshold which, instead selects the next most rank deficient MIMO channel to be made the subject of precoding; and
applying precoding to transmissions on the selected MIMO channel to reduce interference experienced by said subscriber station in the second cell.

* * * * *